United States Patent [19]

Chen et al.

[11] Patent Number: 4,547,547

[45] Date of Patent: Oct. 15, 1985

[54] POLYMER BLENDS

[75] Inventors: Augustin T. Chen, Cheshire; Kemal Onder, North Haven, both of Conn.

[73] Assignee: The Dow Chemical Company, Midland, Mich.

[21] Appl. No.: 557,029

[22] Filed: Dec. 1, 1983

[51] Int. Cl.[4] ............................................. C08L 67/02
[52] U.S. Cl. ................................... 524/538; 525/425; 525/440; 524/539
[58] Field of Search ................ 525/440, 425; 524/538, 524/539

[56] References Cited

U.S. PATENT DOCUMENTS

| | | | |
|---|---|---|---|
| 4,129,715 | 12/1978 | Chen et al. | 528/67 |
| 4,401,792 | 8/1983 | Axelrod et al. | 525/175 |
| 4,404,161 | 9/1983 | Bier | 264/328.16 |

*Primary Examiner*—John C. Bleutge
*Assistant Examiner*—Patricia Short
*Attorney, Agent, or Firm*—James S. Rose; Michael S. Jenkins

[57] ABSTRACT

The impact resistance and crystallization velocity of polyalkylene terephthalates (polyethylene and polybutylene terephthalates in particular) are improved significantly by blending said polyesters with a minor amount of a segmented polyesteramide.

16 Claims, 1 Drawing Figure

POLYMER BLENDS

BACKGROUND OF THE INVENTION

1. Field of the Invention

This invention relates to modified polyester compounds and is more particularly concerned with blends of polyalkylene terephthalates with segmented polyester amides.

2. Description of the Prior Art

Polyalkylene terephthalates are well-known in the art and are described, for example, in U.S. Pat. Nos. 2,465,319 and 3,047,539. The polyalkylene terephthalates are particularly advantageous as film and fiber forming materials and more recently have become important as resins for use in the preparation of finished products by injection molding. Of these various polyesters polyethylene terephthalate, polybutylene terephthalate, and blends of the two are the most frequently employed materials. However, the crystallization rates of these polyesters, especially those of polyethylene terephthalate, are undesirably low. In order to achieve maximum properties in molded parts it is necessary to maintain the part in the mold until crystallization has taken place fully. Because the crystallization rates are relatively slow, this means that the time required for a complete mold cycle is also correspondingly high compared with other plastics.

A wide variety of methods of improving the rate of crystallization has been described in the art. Such methods include incorporation of nucleating agents, such as finely divided solid inorganic materials, and blending with other polymers such as polyacrylates. Illustrative of these methods are those described in U.S. Pat. Nos. 4,401,792 and 4,404,161.

We have now found that, by incorporating into the polyalkylene terephthalate minor amounts of certain segmented polyester amides, it is possible not only to increase significantly the rate of crystallization of polyesters but also in many cases to improve markedly the impact resistance of the polyesters and thereby render them useful as suitable materials for the preparation of a wide variety of structural components.

SUMMARY OF THE INVENTION

The present invention relates to novel polymer blends having high impact resistance and greatly improved rates of crystallization said blends comprising
  (a) from 50 to 95 percent by weight of a polyalkylene terephthalate; and as the balance of said blend,
  (b) a segmented polyesteramide characterized by a recurring unit of the formula

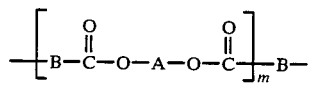

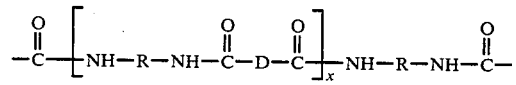

wherein R is selected from the class consisting of arylene of the formulae:

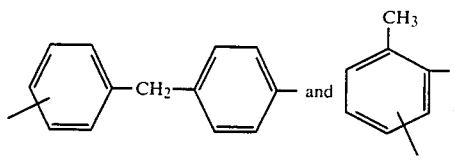

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, inclusive, and isophthalic and terephthalic acids, m has a mean value of not more than 1 but greater than 0, D is the residue of a dicarboxylic acid HOOC—D—COOH such that the melt temperature of the hard segment is not greater than 280° C., and x is a number having an average value from zero to 10.

The present invention also comprises a process for increasing the rate of crystallization of a polyalkylene terephthalate by incorporating therein a minor proportion of a segmented polyester amide as hereinbefore defined.

The term "polymeric diol" which is used herein to characterize residue A in formula (I) above is inclusive of polyether and polyester diols having molecular weights within the stated range. Illustrative of polyether diols are the poly(alkylene ether)diols obtained by polymerizing one or more cyclic ethers such as ethylene oxide, propylene oxide, butylene oxide and tetrahydrofuran. The poly(alkylene ether)diols are inclusive of polyethylene glycol, polypropylene glycol, poly(tetramethylene glycol), polypropylene glycols capped with ethylene oxide, random copolymers of ethylene oxide and propylene oxide, and adducts of ethylene oxide, propylene oxide and like alkylene oxides with homopolymers of conjugated alkadienes such as butadiene, isoprene and the like, and copolymers of said alkadienes with vinyl monomers such as acrylonitrile, methacrylonitrile, styrene, and the like. Preferred polyether diols for use in preparing the polyester amides are poly(tetramethylene glycol) and ethylene oxide-capped polypropylene glycols wherein the ethylene oxide content is within the range of about 5 percent to about 40 percent.

Illustrative of the polyester diols are those obtained by reacting a dicarboxylic acid such as adipic, suberic, azelaic, glutaric acids and the like, with an excess, over the stoichiometric amount, of a dihydric alcohol such as ethylene glycol, propylene glycol, 1,4-butanediol, 1,6-hexanediol and the like, including mixtures of two or more such diols.

The term "aliphatic dicarboxylic acids having from 6 to 14 carbon atoms" means the acids represented by the formula HOOC—$C_nH_{2n}$—COOH wherein the total number of carbon atoms, including those in the carboxylic groups, lies within the stated range and $C_nH_{2n}$ represents straight or branched chain alkylene having the appropriate carbon atom content. Illustrative of such acids are adipic, pimelic, suberic, azelaic, sebacic, 1,11-undecandioic and 1,12-dodecandioic, brassylic, α-methyladipic, α,α-dimethyladipic, α-ethylpimelic, α-ethyl-α-methylpimelic, β,β'-diethyl-β,β'-dimethylsuberic, 2,2,4-trimethyladipic, 2,4,4-trimethyladipic, α,α-dimethylazelaic and α,α,α',α'-tetramethylsebacic acids.

The term "dicarboxylic acid HOOC-D-COOH" is inclusive of straight and branched chain aliphatic dicarboxylic acids which do not raise the melt temperature of the hard section of the polymer into which they are introduced above about 280° C. Illustrative of such acids are adipic, azelaic, sebacic, suberic, 1,11-undecandioic, 1,12-dodecandioic, brassylic, and trimethyladipic acids. Particularly preferred are azelaic and adipic as well as a mixture of approximately equimolar amounts of these two acids.

DETAILED DESCRIPTION OF THE INVENTION

Figure 1:
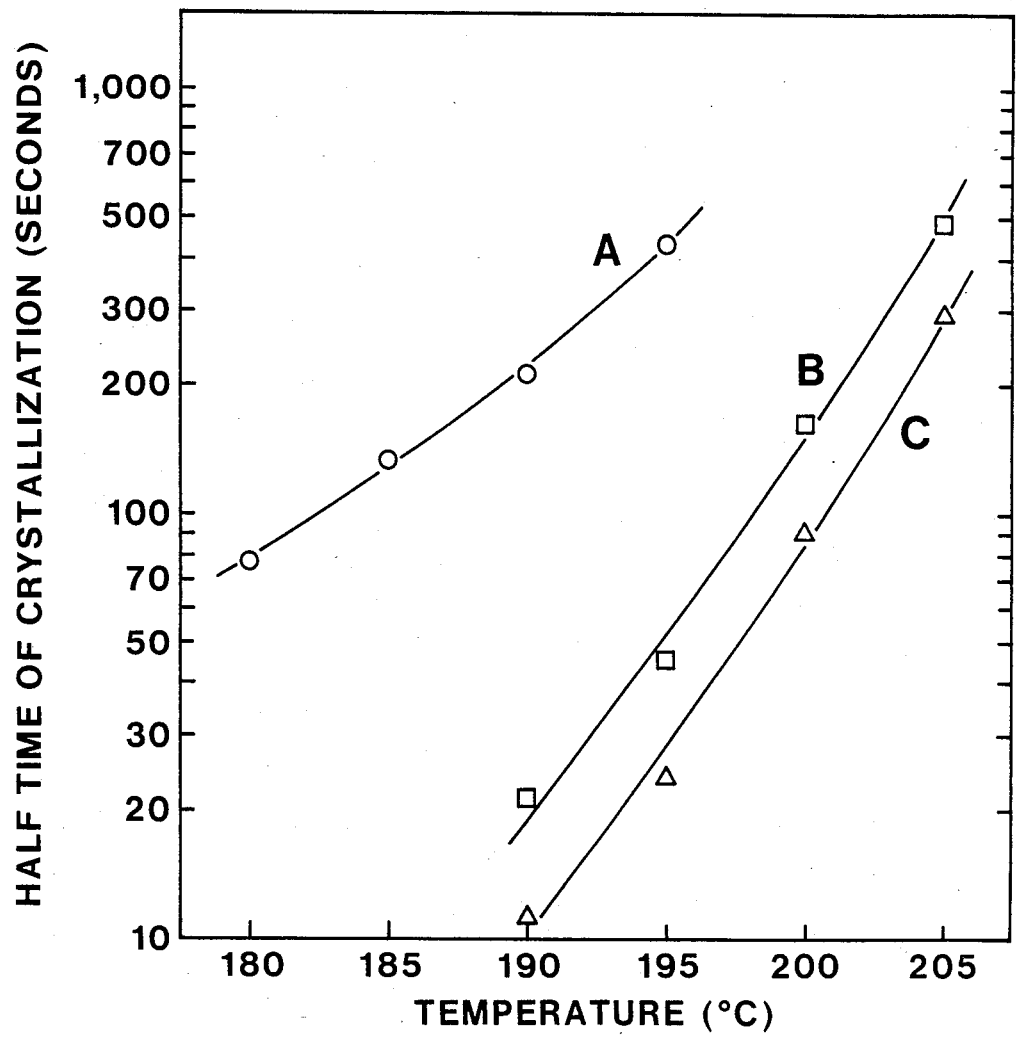

The invention is directed broadly to a blend of a polyalkylene terephthalate with a minor amount of a segmented polyesteramide and to a process for improving the rate of crystallization and/or impact strength of the polyalkylene terephthalate.

The polyalkylene terephthalate component of the blends can be any of those terephthalates which are available commercially or which can be prepared by known techniques such as by alcoholysis of terephthalic acid esters with diprimary alcohols such as ethylene glycol, polymethylene glycols, di-, tri-, tetra- or pentamethylene glycols, and the like, and subsequent polymerization by heating the glycols with the free acids or with the halide derivatives thereof, or by similar processes such as those described in U.S. Pat. Nos. 2,465,319 and 3,047,539. A preferred group of polyesters are polyethylene terephthalates, polypropylene terephthalates and polybutylene terephthalates and blends of two or more thereof.

The polyesters generally have an intrinsic viscosity of at least about 0.4 dl./per gram and preferably at least about 0.6 dl./per gram as measured in 60:40 phenol/tetrachloroethane mixture at 30° C. in a concentration of 0.5 percent by weight.

The segmented polyesteramide component of the blends of the invention can be any of those polyesteramides which are described in U.S. Pat. No. 4,129,715, the disclosures of which are incorporated herein by reference. Detailed procedures for the preparation of the polyesteramides are given in the aforesaid patent and will not be repeated here in the interests of brevity.

A preferred group of polyesteramides for use in preparing the polymer blends of the invention are those having the recurring unit of formula (I) wherein A is the residue of a polyesterdiol HO—A—OH, which polyesterdiol is the hydroxyl-terminated product of reaction of adipic, azelaic or 1,12-dodecanoic acid with an excess of 1,4-butanediol or 1,6-hexanediol, and B and D are the residues of adipic or azelaic acids.

The proportions in which the polyester component and the polyesteramide component are employed in the blends is generally within the range of about 95 to about 50 percent by weight of the polyester, the remainder of the blend being the polyesteramide. A preferred range of proportions is from 90 percent to 65 percent of the polyester, the remainder of the blend being polyesteramide.

The blends can be prepared in any convenient manner. For example, by bringing together the two components in solid form and dry-blending using conventional means such as a barrel mixer, a tumble mixer, and the like. Alternatively, the components are brought together and fluxed in an appropriate mixing apparatus such as a Banbury type internal mixer, rubber mill twin screw compounder, and the like. Preferably, the two components are brought together and processed in an appropriate melt extruder from which the blend is extruded in the form of strands and the like which are then pelletized for injection molding purposes. Standard techniques and apparatus well-known in the art can be used for these purposes.

The polymer blends of the invention are characterized by a markedly improved rate of crystallization, and, in many cases, by markedly improved impact strength, and by the ability to withstand a plurality of melting and cooling cycles without loss of rate of crystallization or any other properties, as compared with the polyalkylene terephthalates alone.

FIG. 1 illustrates the marked improvement in rate of crystallization achieved by forming the blends of the present invention. FIG. 1 shows a plot of half the time required for crystallization of the molten material after rapid cooling to each of a series of specified temperatures. All the data was generated using a differential scanning calorimeter using a Du Pont Model 990 Controller and Model 910 DSC with a sample size of 40 milligrams. Each point on the curve was determined by heating the sample above its melting point (usually to 280° C.) and then cooling rapidly to the specific temperature desired. The time required for the sample to crystallize at the specified temperature was determined by observing the point at which the maximum exotherm (corresponding to heat of crystallization) occurred. The half time required for crystallization was then calculated and the plot made using logarithmic paper.

Curve A represents the determinations carried out on a sample of a commercially available polybutylene terephthalate (Valox 310; General Electric). Curve B shows the plot for a blend of the same polybutylene terephthalate with 15 percent by weight of a polyesteramide prepared in accordance with U.S. Pat. No. 4,129,715. Curve C shows the plot for a similar blend in which the amount of polyesteramide was raised to 30 percent by weight.

A comparison of the half time of crystallization of the three samples at 190° C. shows very clearly the dramatic drop in the half time, i.e. the dramatic increase in rate of crystallization, of the two blended samples compared with the polybutylene terephthalate alone. For example, the difference in half time between the polybutylene terephthalate alone and the blend shown as Curve B is of the order of 10 times. The difference between that of the terephthalate alone and the blend shown in Curve C is of the order of 20 times. The polyesteramide (Polyesteramide A) used in the above blends is that which is described more fully in Example 1 below.

The effect on impact strength of the polyalkylene terephthalates produced by incorporation of the polyesteramides in accordance with the present invention is well illustrated by the data set forth in the specific examples below. Although the formation of the blend tends to lower the tensile strength and flex modulus properties of the terephthalate, the reduction in these properties is not such as to be deleterious. The structural strength properties of the blends of the invention are such that these materials can be used as engineering plastics and can be injection molded to prepare a wide variety of finished products. Illustratively, the compositions of the invention can be fabricated in any desired configuration for use as automobile body parts, equipment housings, mechanical goods, gears, gaskets and a wide variety of other such articles which require the high impact resistance and structural strength properties possessed by the polymer blends of the invention.

Further, it has been found that the blends of the invention can withstand a large number of cycles of melting and cooling to effect crystallization without loss of any significant structural strength or other properties including the high rate of crystallization.

The compositions of the invention can also incorporate various additives such as fillers, antioxidants, pigments, fire retardants, plasticizers, reinforcing agents such as glass fiber and the like, which are commonly employed in the art in polyalkylene terephthalate compositions. The additives are readily incorporated into the blends during the formation of the latter using any of the procedures described above.

The following preparations and examples describe the manner and process of making and using the invention and set forth the best mode contemplated by the inventors of carrying out the invention but are not to be construed as limiting.

Preparation of ester-amides

The Polyesteramides A and B used in the following examples were prepared as follows.

Polyesteramide A

Using the procedure described in Example 1 of U.S. Pat. No. 4,129,715 a carboxylic acid-terminated prepolymer was prepared from 28.24 parts by weight of 1,4-butanediol and 77.31 parts by weight of azelaic acid in the presence of 0.07 parts by weight of p-toluene-sulfonic acid. The prepolymer so obtained [62.56 parts by weight] was then reacted with azelaic acid [14.54 parts by weight] and 4,4′-methylenebis(phenyl isocyanate) [35.18 parts by weight] in the presence of 1,3-dimethyl-phospholene-1-oxide [0.25 parts by weight] and anhydrous tetramethylene sulfone [420 parts by weight] using the procedure described in Example 9, second part, of the aforesaid U.S. Pat. No. 4,129,715. The resulting segmented Polyesteramide A had an inherent viscosity (0.5 g/100 ml.) in N-methylpyrrolidone at 30° C. of 0.8 dl/g. and was characterized by a recurring unit of formula (I) above in which A is the residue of poly(-tetramethylene azelate)glycol, B and D are residues of azelaic acid, and R is

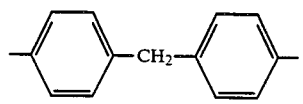

Polyesteramide B

Using the same procedures as described and referenced for Polyesteramide A above, 242.75 parts by weight of a carboxylic acid-terminated prepolymer, prepared from 903 parts by weight of polytetramethylene glycol [Teracol 1000: M.W. 1000: Du Pont] and 386.7 parts by weight of azelaic acid, was reacted with 48.79 parts by weight of azelaic acid and 116.38 parts by weight of 4,4′-methylenebis(phenyl isocyanate). The Polyesteramide B so obtained had an inherent viscosity of 0.91 dl/g. (0.5 percent w/w in N-methylpyrrolidone at 30° C.) and was characterized by a recurring unit of formula (I) above in which A is the residue of poly(tetramethylene glycol), B and D are residues of azelaic acid and R is

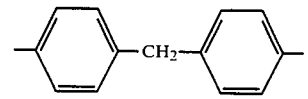

Example 1

Polymer blends in accordance with the invention were prepared from a commercially available poly(butylene terephthalate) [Valox 310GP; General Electric] and two different levels (15 percent and 30 percent w/w) of Polyesteramide A. Triphenylphosphite (0.5 percent by weight based on total blend) was incorporated in the blends as a stabilizing agent. The blends were prepared by admixing the various components in comminuted form using a Patterson Portashell mixer and the resulting mixture was homogenized by extrusion as strands (3/16 inch diameter) using a Brabender vented extruder fitted with a screw of L/D ratio 25:1 and having a compression ratio of 4:1. The temperature setting in Zones 1 and 2 was 240° C. and in Zones 3 and 4 was 245° C. The extruder was operated at 40 rpm with a torque of ca. 1500 m-g. The extruded strands were pelletized.

Using the differential scanning calorimeter method described hereinabove the half time for isothermal crystallization to occur, after heating to the liquid state (temperature stated in TABLE I) following by rapid cooling to a predetermined temperature, was determined in respect of each of the above two blends and of the poly(butylene terephthalate) used to prepare the blends. The results of these determinations are recorded in TABLE I below and the data so recorded (using melt temperatures of 280° C. only) is shown in graph form as FIG. 1. TABLE I also records the same data in respect of a blend prepared as described above from 70 parts by weight of Valox 310GP, 15 parts by weight of Polyesteramide A, and 15 parts by weight of a poly(butylacrylate) impact modifier (Acryloid KM330: ROHM and Haas Inc., Bulletin MR-108: January 1980). This latter data is not shown in graph form in FIG. 1.

TABLE I

| | Sample | Isothermal Crystallization Half Time (seconds) | | | | | |
|---|---|---|---|---|---|---|---|
| | | At 180° C. | 185° C. | 190° C. | 195° C. | 200° C. | 205° C. |
| 1. | Valox 310GP alone: | | | | | | |
| | melted at 250° C. | 54 | 94.8 | 177.6 | 336 | | |
| | melted at 280° C. | 78 | 132 | 213.6 | 438 | | |
| 2. | Valox 310GP (85 parts) Polyesteramide A (15 parts) melted at 280° C. | | | 21.6 | 45.6 | 163.2 | 490.8 |

TABLE I-continued

| Sample | | Isothermal Crystallization Half Time (seconds) | | | | | |
|---|---|---|---|---|---|---|---|
| | | At 180° C. | 185° C. | 190° C. | 195° C. | 200° C. | 205° C. |
| 3. | Valox 310GP (70 parts) Polyesteramide A (30 parts) melted at 250° C. melted at 280° C. | | | 8.4 10.8 | 12 24 | 86.4 92.4 | 196.8 295.2 |
| 4. | Valox 310GP (70 parts) Polyesteramide A (15 parts) Poly(butylacrylate) (15 parts) melted at 280° C. | | | 38.4 | 87.6 | 304.8 | 846 |

The data clearly shows the dramatic increase in rate of crystallization at 190° C. and 195° C. of the Blends 2, 3 and 4 as compared with the unblended starting material. Test bars were injection molded from the unblended starting material and each of the Blends 2, 3 and 4 above using an Arburg machine. The feed zone and center zone temperature settings were 240° C. and the nozzle setting was 245° C. The screw speed setting was 140 rpm, the injection pressure setting was 750 psi, the injection speed setting was 3 seconds and the mold temperature 66° C. The physical properties determined using the test bars are set forth in TABLE II below.

TABLE II

| Property | Valox 310GP alone | Blend 2 | Blend 3 | Blend 4 |
|---|---|---|---|---|
| [1]Tensile strength: psi at break | 6080 | 5000 | 8500 | 4525 |
| [1]Tensile at yield: psi | 7560 | 5370 | 4520 | 4140 |
| [1]Tensile modulus: psi | N.T. | 181,600 | 127,800 | 177,190 |
| [1]Elongation: % | | | | |
| Yield | 3.1 | 13.8 | 15 | 11 |
| Break | 145 | 300 | 600 | 208 |
| [2]Flexural modulus: psi | 371,900 | 222,600 | 190,800 | 186,900 |
| [2]Flexural strength: psi | N.T. | 8440 | 7020 | 6415 |
| [3]Notched Izod Impact ⅛": ft. lbs./in. | 0.9 | 1.84 | 18.46 | 11.78 |
| [4]Heat Deflection Temp. | | | | |
| at 66 psi: °C. | 153 | 125 | 115 | 96 |
| at 264 psi: °C. | 73 | 49 | 48 | 62 |

[1]ASTM D638-68
[2]ASTM D790
[3]ASTM D256-56
[4]ASTM D648

Example 2

Using the procedure in Example 1, two blends were prepared in extruded pelletized form from Valox 310 and Polyesteramide B. Blend 5 contained 85 parts by weight of Valox 310 and 15 parts by weight of Polyesteramide B. Blend 6 contained 70 parts by weight of Valox 310 and 30 parts by weight of Polyesteramide B. Both blends also contained 0.5 percent by weight, based on total blend weight, of triphenylphosphite. The half times for isothermal crystallization for each of the blends were determined as described in Example 1 and the data so derived is set forth in TABLE III below; the data for Valox 310 alone (taken from TABLE I) is also shown for purposes of comparison. Test bars were also prepared from both blends by injection molding using the conditions described in Example 1. The physical properties determined on these test bars are recorded in TABLE IV below; the corresponding data for test bars prepared from Valox 310 alone are also included for comparison purposes.

TABLE III

| Sample | | Isothermal Crystallization Half Time (seconds) | | | |
|---|---|---|---|---|---|
| | At | 190° C. | 195° C. | 200° C. | 205° C. |
| Valox 310GP alone (melted to 280° C.) | | 213.6 | 436 | | |
| Blend 5 (melted to 280° C.) | | 28.8 | 43.2 | 157.2 | 511.2 |
| Blend 6 (melted to 280° C.) | | 34.8 | 72 | 234 | 702 |

TABLE IV

| Property | Valox 310GP alone | Blend 5 | Blend 6 |
|---|---|---|---|
| Tensile strength: psi | | | |
| at break | 6080 | 6140 | 7900 |
| at yield | 7560 | 5500 | 4600 |
| Tensile modulus: psi | N.T. | 219,500 | 173,300 |
| Elongation: % | | | |
| Yield | 3.1 | 3.8 | 3.8 |
| Break | 145 | 274 | 228 |
| Flexural modulus: psi | 371,900 | 311,390 | 244,000 |
| Flexural strength: psi | N.T. | 10,240 | 8230 |
| Notched Izod Impact ⅛": ft. lbs./in. | 0.9 | 2.51 | 10.83 |
| Heat Deflection Temp. at 66 psi: °C. | 153 | 148.5 | 127 |

Example 3

Using the procedure described in Example 1, two blends (7 and 8) were prepared in extruded pelletized form from a commercially available poly(ethylene terephthalate) [Cleartuf 7207A: Goodyear] and Polyesteramide A. Blend 7 contained 85 parts of Cleartuf 7207A and 15 parts of Polyesteramide A. Blend 8 contained 70 parts of Cleartuf 7207A and 30 parts of Polyesteramide A. Both blends also contained 0.5 percent by weight, based on total blend weight, of triphenylphosphite. The half times for isothermal crystallization for Cleartuf 7207A alone and for Blends 7 and 8 were determined as described in Example 1 and the data so derived is set forth in TABLE V below. Test bars were also prepared from Cleartuf 7207A and from Blends 7 and 8 by injection molding using the conditions described in Example 1. The physical properties determined on these test bars are recorded in TABLE VI below.

TABLE V

| Sample | Isothermal Crystallization Half Time (seconds) | | | | |
|---|---|---|---|---|---|
| | At 200° C. | 205° C. | 210° C. | 215° C. | 220° C. |
| Cleartuf 7207A (melted at 280° C.) | 318 | | | | |
| Blend 7 (melted at 280° C.) | 32.4 | 61.2 | 104.4 | 184.8 | 421.2 |
| Blend 8 (melted at 280° C.) | 30 | 64.8 | 109.2 | 195.6 | 420 |

TABLE VI

| Property | Cleartuf alone | Blend 7 | Blend 8 |
|---|---|---|---|
| Flexural modulus: psi | 306,000 | 255,900 | 193,600 |
| Flexural strength: psi | 12,070 | 9,900 | 7,590 |
| Notched Izod Impact: ⅛": ft. lbs./in. | 1.12 | 1.13 | 3.59 |

Example 4

Using the procedure described in Example 1, two blends (9 and 10) were prepared in extruded pelletized form from a commercially available poly(ethylene terephthalate) [Kodapak: Eastman Kodak] and Polyesteramide A. Blend 9 contained 85 parts of Kodapak and 15 parts of Polyesteramide A. Blend 10 contained 70 parts of Kodapak and 30 parts of Polyesteramide A. Both blends also contained 0.5 percent by weight, based on total blend weight, of triphenylphosphite. The half times for isothermal crystallization for Kodapak alone and for Blends 9 and 10 were determined as described in Example 1 and the data so derived is set forth in TABLE VII below. Test bars were also prepared from Kodapak and from Blends 9 and 10 by injection molding using the conditions described in Example 1. The physical properties determined on these test bars are recorded in TABLE VIII below.

TABLE VII

| Sample | Isothermal Crystallization Half Time (seconds) | | | | | | | |
|---|---|---|---|---|---|---|---|---|
| | At 165° C. | 170° C. | 175° C. | 180° C. | 200° C. | 205° C. | 210° C. | 215° C. |
| Kodapak alone (melted at 280° C.) | 232 | 238 | 270 | 471 | | | | |
| Blend 9 (melted at 280° C.) | | | | | 32.4 | 61.2 | 104.4 | 199.2 |
| Blend 10 (melted at 280° C.) | | | | | 30 | 61.2 | 105.6 | 159.6 |

TABLE VIII

| Property | Kodapak | Blend 9 | Blend 10 |
|---|---|---|---|
| Flexural modulus: psi | 324,400 | 238,700 | 180,000 |
| Flexural strength: psi | 12,350 | 9,440 | 7,230 |
| Notched Izod Impact: ⅛": ft. lbs./in. | 0.45 | 0.64 | 1.14 |

Example 5

This Example shows the effect of blending a fiberglass reinforced polyethylene terephthalate with a polyesteramide in accordance with the invention.

The fiberglass reinforced polyethylene terephthalate employed was that which is available commercially as Rynite ®530 (Du Pont) and is believed to contain 30 percent by weight of fiberglass.

The following two blends were prepared using the procedure described in Example 1, but employing the following conditions in the Brabender extrusion.

| | | |
|---|---|---|
| Temperature settings | Zones 1 and 2 | 260° C. |
| | Zone 3 | 270° C. |
| | Zone 4 | 275° C. |
| Screw speed setting | | 45 rpm |
| Torque setting | | 1000 m-g. |
| Blend 11 | 595 parts by weight of Rynite 530 | |
| | 105 parts by weight of Polyesteramide A | |
| | 3.5 parts by weight of triphenylphosphite | |
| Blend 12 | 490 parts by weight of Rynite 530 | |
| | 210 parts by weight of Polyesteramide A | |
| | 3.5 parts by weight of triphenylphosphite | |

The half times for isothermal crystallization of Rynite 530 alone and for Blends 11 and 12 were determined as described in Example 1 (all samples melted at 280° C.) and the data so derived is shown in TABLE IX below. It will be seen from this data that Blends 11 and 12 show significant increase in rate of crystallization as compared with Rynite 530 itself. Test bars were also prepared from Rynite 530 and Blends 11 and 12 by injection molding using the procedure described in Example 1. The physical properties determined on these test bars are recorded in TABLE X below.

TABLE IX

| Sample | Isothermal Crystallization Half Time (seconds) | | | |
|---|---|---|---|---|
| | At 210° C. | 215° C. | 220° C. | 225° C. |
| Rynite 530 | 34.8 | 80.4 | 166.8 | 396 |
| Blend 11 | 30 | 61.2 | 128.4 | 276 |
| Blend 12 | 28.8 | 58.8 | 105.6 | 213.6 |

TABLE X

| Property | Rynite 530 | Blend 11 | Blend 12 |
|---|---|---|---|
| Tensile strength at break: psi | 23,000 | 12,830 | 9,800 |
| Tensile modulus: psi | N.T. | 606,100 | 489,500 |
| Elongation at break: % | 2.7 | 3.9 | 5.0 |
| Flexural modulus: psi | 1,300,000 | 876,000 | 700,800 |
| Flexural strength: psi | 33,500 | 21,650 | 17,290 |
| Notched Izod | 1.9 | 2.0 | 3.0 |

TABLE X-continued

| Property | Rynite 530 | Blend 11 | Blend 12 |
|---|---|---|---|
| Impact ⅛": ft. lbs./in. | | | |
| Heat Deflection Temp. (°C.) | | | |
| at 264 psi | 220 | 204 | 198 |
| 66 psi | N.T. | 238 | 232 |

I claim:
1. A fluxed polymer blend comprising
   (a) from 95 to 50 percent by weight of a polyalkylene terephthalate; and, as the balance of said blend,
   (b) a segmented polyesteramide characterized by a melt temperature no greater than 300° C. and by a recurring unit of the formula

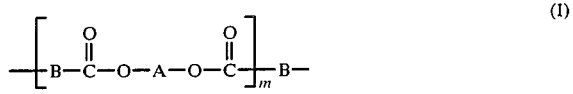

(I)

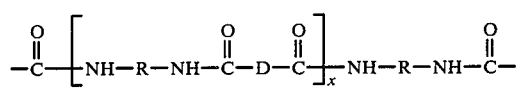

wherein R is selected from the class consisting of arylene of the formulae:

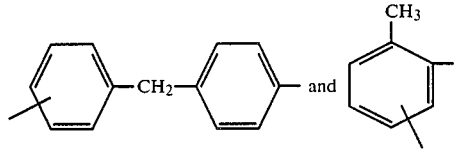

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, inclusive, and isophthalic and terephthalic acids, m has a mean value of not more than 1 but greater than 0, D is the residue of a dicarboxylic acid HOOC—D—COOH such that the melt temperature of the hard segment is not greater than 280° C., and x is a number having an average value from zero to 10.

2. A polymer blend in accordance with claim 1 wherein the residue A in the polyesteramide is that of a polyester glycol.

3. A polymer blend in accordance with claim 2 wherein said polyester glycol is a poly(tetramethylene azelate)glycol.

4. A polymer blend in accordance with claim 1 wherein the residue A in the polyesteramide is that of a polyether glycol.

5. A polymer blend in accordance with claim 4 wherein said polyether glycol is a polytetramethylene glycol.

6. A polymer blend in accordance with claim 1, wherein the residue D in the polyesteramide is that of azelaic acid.

7. A polymer blend in accordance with claim 1 wherein the residue B in the polyesteramide is that of azelaic acid.

8. A polymer blend in accordance with claim 1 wherein the polyalkylene terephthalate is a polyethylene terephthalate having an intrinsic viscosity of at least 0.4 dl/g. when measured as a 0.5 percent w/w solution in 60:40 phenol/tetrachloroethane.

9. A polymer blend in accordance with claim 1 wherein the polyalkylene terephthalate is a polybutylene terephthalate having an intrinsic viscosity of at least 0.4 dl/g. when measured as a 0.5 percent w/w solution in 60:40 phenol/tetrachloroethane.

10. A polymer blend in accordance with claim 1 which also comprises a reinforcing agent.

11. A polymer blend in accordance with claim 10 wherein said reinforcing agent is fiberglass.

12. A fluxed polymer blend comprising:
   (a) from 95 to 50 percent by weight of a polybutylene terephthalate having an intrinsic viscosity of at least 0.4 dl/g. when measured as a 0.5 percent w/w solution in a 60:40 phenol/tetrachloroethane; and, as the balance of said blend,
   (b) a segmented polyesteramide characterized by a melt temperature no greater than 300° C. and by a recurring unit of the formula

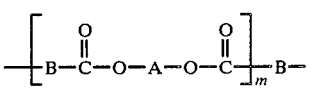

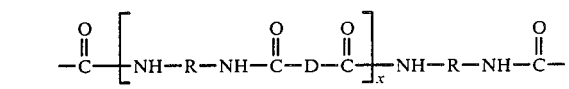

wherein R is

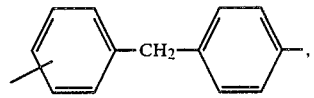

A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, inclusive, and isophthalic and terephthalic acids, m has a mean value of not more than 1 but greater than 0, D is the residue of a dicarboxylic acid HOOC—D—COOH such that the melt temperature of the hard segment is not greater than 280° C. and x is a number having an average value from zero to 10.

13. A polymer blend in accordance with claim 12 wherein the polyesteramide is further characterized in that residue A is that of a polyester glycol, residue B is that of azelaic acid, and residue D is that of azelaic acid.

14. A polymer blend in accordance with claim 12 wherein the polyesteramide is further characterized in that residue A is that of a polyether glycol, and the residue B and D are those of azelaic acid.

15. A polymer blend in accordance with claim 14 wherein said polyether glycol is polytetramethylene glycol.

16. A process for increasing the rate of crystallization of a polyalkylene terephthalate which comprises fluxing into said terephthalate a minor amount of a polyesteramide characterized by a melt temperature no greater than 300° C. and by a recurring unit of the formula

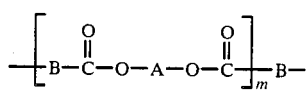

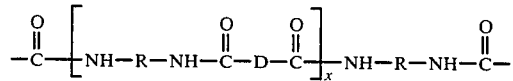

wherein R is selected from the class consisting of arylene of the formulae:

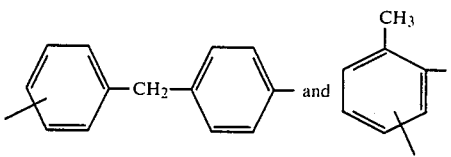

and mixtures thereof, A is the residue of a polymeric diol HO—A—OH having a molecular weight from about 400 to about 4000, B is the residue of a dicarboxylic acid HOOC—B—COOH selected from the class consisting of aliphatic dicarboxylic acids having from 6 to 14 carbon atoms, inclusive, and isophthalic and terephthalic acids, m has a mean value of not more than 1 but greater than 0, D is the residue of a dicarboxylic acid HOOC—D—COOH such that the melt temperature of the hard segment is not greater than 280° C., and x is a number having an average value from zero to 10.

* * * * *